(12) United States Patent
Hezel et al.

(10) Patent No.: US 7,677,130 B2
(45) Date of Patent: Mar. 16, 2010

(54) PAINTING ROBOT WITH IMPROVED WRIST CONDUIT

(75) Inventors: Thomas Hezel, Asperg (DE); Steffen Hein, Marbach (DE); Georg M. Sommer, Weinstadt (DE)

(73) Assignee: Duerr Systems, Inc., Auburn Hills, MI (US)

( * ) Notice: Subject to any disclaimer, the term of this patent is extended or adjusted under 35 U.S.C. 154(b) by 922 days.

(21) Appl. No.: 10/768,373

(22) Filed: Jan. 30, 2004

(65) Prior Publication Data

US 2004/0237154 A1    Nov. 25, 2004

(30) Foreign Application Priority Data

Feb. 5, 2003   (DE)   ................. 103 04 652

(51) Int. Cl.
  *B25J 17/02*   (2006.01)
(52) U.S. Cl. ................................... 74/490.06
(58) Field of Classification Search ............. 74/479.01, 74/490.01, 490.02, 490.05, 490.06; 138/121, 138/119, 30
  See application file for complete search history.

(56) References Cited

U.S. PATENT DOCUMENTS

| 4,378,959 | A | * | 4/1983 | Susnjara | 414/732 |
| 4,632,632 | A | * | 12/1986 | Simone | 414/744.7 |
| 4,688,983 | A | * | 8/1987 | Lindbom | 414/735 |
| 4,839,490 | A | * | 6/1989 | DeSaw | 219/74 |
| 4,913,613 | A | * | 4/1990 | Hirschmann | 414/751.1 |
| 5,025,126 | A | * | 6/1991 | Hansen | 219/125.1 |
| 5,437,207 | A | * | 8/1995 | Zimmer | 74/490.02 |
| 5,816,108 | A | * | 10/1998 | Obata et al. | 74/490.05 |
| 5,848,556 | A | * | 12/1998 | Ryu et al. | 74/490.02 |
| 6,622,756 | B2 | * | 9/2003 | Berninger et al. | 138/121 |
| 6,795,750 | B2 | * | 9/2004 | Kullborg | 700/245 |
| 7,104,153 | B2 | * | 9/2006 | Matsumoto et al. | 74/490.02 |

FOREIGN PATENT DOCUMENTS

EP    1036711    9/2000

* cited by examiner

*Primary Examiner*—Vicky A Johnson
(74) *Attorney, Agent, or Firm*—Rader Fishman & Grauer

(57) ABSTRACT

The invention relates to a robot, specifically a painting robot, having at least one moveable member which has a conduit for lines which houses at least one line. It is proposed that the line is disposed in the conduit at least partially in a spiral or winding configuration and/or is carried by an axially compliant bellows to allow axial movement of the line with a change in the position of the robot.

16 Claims, 3 Drawing Sheets

PAINTING ROBOT WITH IMPROVED WRIST CONDUIT

CROSS REFERENCE TO RELATED APPLICATION

This application claims the foreign priority benefits of German application S.N. 103 04 652.6, filed Feb. 5, 2003.

FIELD OF THE INVENTION

The invention relates to a robot, specifically a painting robot.

BACKGROUND OF THE INVENTION

Industrial robots are known from U.S. Pat. No. 4,708,580 having a wrist axis which has three degrees of freedom, where the wrist axis has an internal conduit for signal and power lines. When the wrist axis moves in the individual degrees of freedom, the lines in the internal conduit of the wrist axis are either stretched or compressed in the axial direction and additionally subjected to torsional loading. This is compensated for in the known industrial robots incorporating a wrist axis of this kind by routing the lines in the internal conduit loosely and consequently providing adequate axial play.

The disadvantage of these known wrist axes is the fact that the lines can be damaged in operation because they are exposed to severe friction from the inner walls and the transitional radii in the internal conduit of the wrist axis. Such damage to the lines with industrial robots during production leads to costly stoppages. Furthermore, a complete bundle of lines has to be replaced if there is damage to one line, resulting in substantial repair costs.

A further disadvantage of the known wrist axes is that the lines in the internal conduit of the wrist axis are carried without suitable sealing in order to allow the wrist axis to move. As a result of the inadequate sealing of the lines, there can be an exchange of fluid between the wrist axis and the robot arm, requiring cost-intensive cleaning.

SUMMARY OF THE INVENTION

The object of the invention is therefore to create a robot having a conduit for lines, damage to the lines during operation being prevented in said robot and there being no exchange of fluid between the wrist axis and the robot arm, whereby the lines must demonstrate sufficient axial play to enable them to follow a movement of the wrist axis.

The invention incorporates the general technical teaching of disposing the lines in the conduit of the wrist axis at least partially in a spiral or a winding formation to permit corresponding axial play in the line when the wrist axis moves.

Furthermore, the invention incorporates the general technical teaching of passing the line in the conduit through an axially compliant bellows which first of all allows axial play in the line and secondly forms a guide for the line.

Preferably the bellows furthermore seals the conduit, for example to prevent an exchange of fluid in a painting robot between the wrist axis and the robot arm. In this instance, the conduit preferably passes through the robot arm and the wrist axis, where the conduit is sealed at the transition between the robot arm and the wrist axis by the bellows. The bellows consequently has two technical functions: first of all the axially compliant routing of the line in the conduit and secondly the sealing of the conduit.

The invention is not limited in this version to the bellows sealing the conduit for the lines at the transition between the robot arm and the wrist axis. Rather, as part of the invention it is also possible for the bellows to seal the conduit for the lines at other transition points between two juxtaposed members of the robot.

The concept of a bellows employed within the framework of the invention must be understood in general terms and not restricted to the preferably employed pleated bellows. The concept of a bellows includes, for example, those compliant elements which carry the line in an axially compliant manner.

In a preferred embodiment of the invention, the conduit for the lines carries several lines, where each of the lines is carried by one bellows.

Other advantageous developments of the invention are described in the dependent claims or are explained in more detail in what follows together with the description of the preferred embodiments of the invention with reference to the drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF PREFERRED EMBODIMENTS

Figure 1:
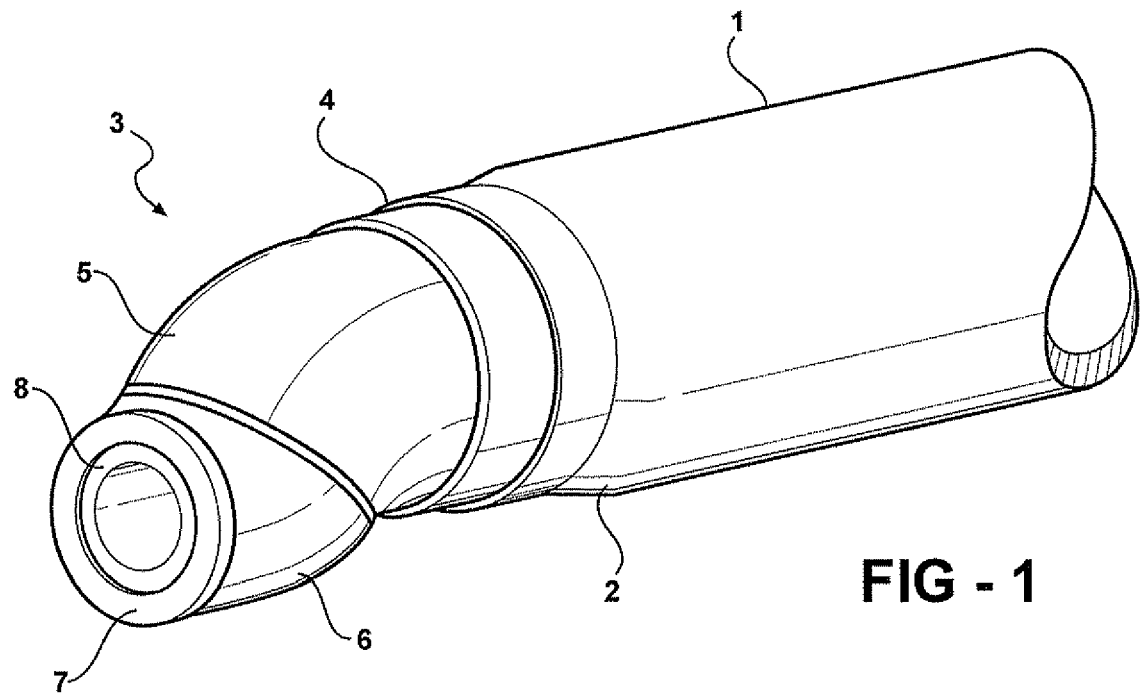
FIG. 1 shows a perspective view of a robot arm with a wrist axis with three degrees of freedom.

The perspective view in FIG. 1 shows a robot arm 1 of an otherwise conventionally constructed painting robot for painting motor vehicle parts.

At its distal end the robot arm 1 has a connecting piece 2 for attaching a robot wrist axis 3, where various embodiments of the connecting piece 2 in accordance with the invention are shown in detail in FIGS. 2a and 2b or 3a and 3b, respectively.

The robot wrist axis 3 has three members 4, 5, 6 which can be rotated relative to each other, where member 4 is carried by the connecting piece and can be rotated relative thereto.

Member 6 on the other hand has an end face 7 for attaching a conventional rotary atomizer.

Furthermore, the robot wrist axis 3 has a conduit 8 for lines through which the lines 9, 10, 11 can be passed/led from the robot arm 1 through the robot wrist axis 3 to the rotary atomizer.

The term line used as part of the invention is to be understood in a general sense and comprises, for example, hoses, pipes, fiber optic cables and electrical wires.

Figure 2A:
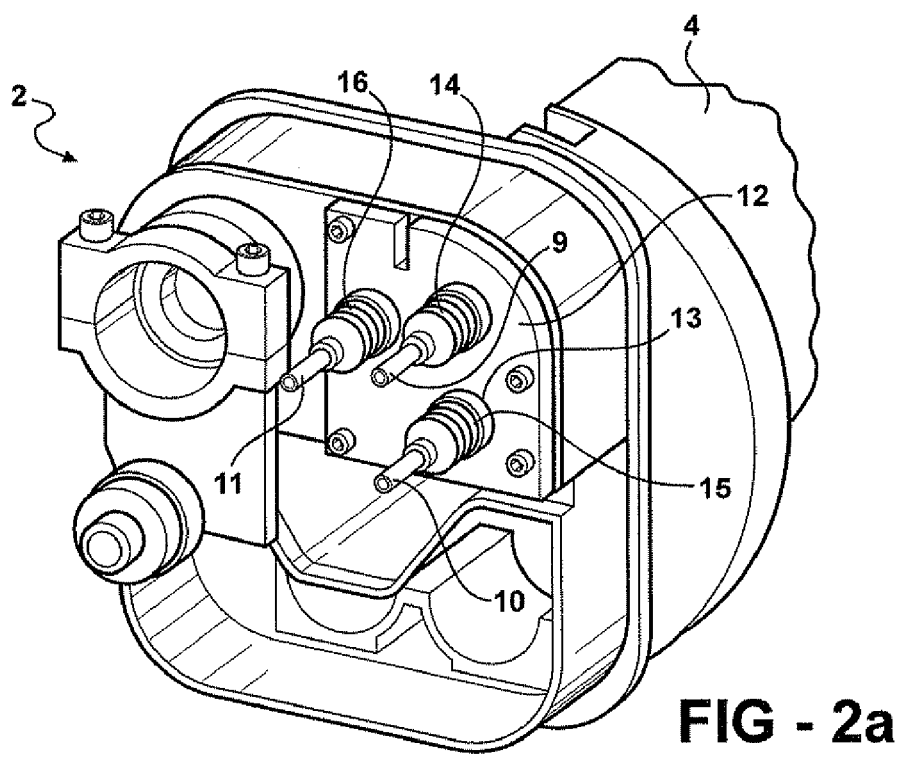
FIG. 2a shows a perspective view of a connecting piece of the robot arm at the transition to the wrist axis.
Figure 2B:
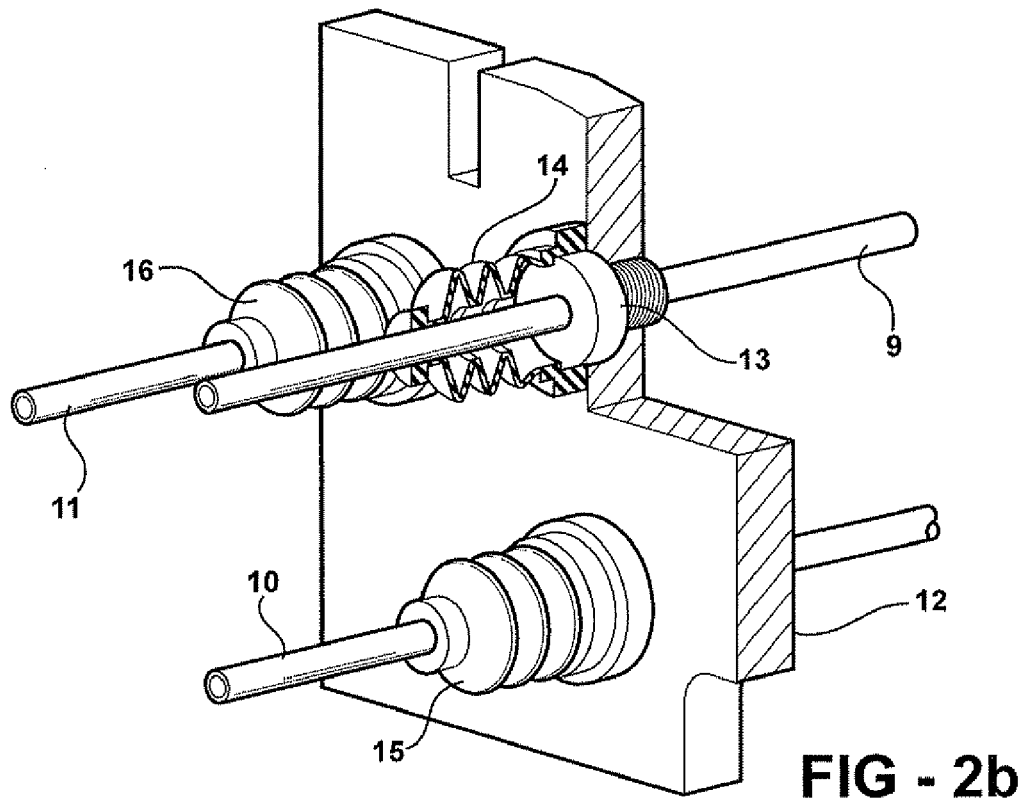
FIG. 2b shows a partially sectioned detail view from FIG. 2a, FIG. 3a shows a perspective view of an alternative connecting piece for the robot arm at the transition to the wrist axis.

The lines 9, 10, 11 are shown in FIGS. 2a and 2b, in this case hoses to supply the rotary atomizer with coating material, drive air and shaping air. In operation, the lines 9, 10, 11 are stretched or compressed in the axial direction because of the rotation of the individual members 4, 5, 6 of the robot wrist axis 3 and are additionally subjected to torsional loading. To permit an axial compensation in length depending on the position of the robot, the lines 9, 10, 11 are carried flexibly in an axial direction in the connecting piece 2.

To do this, a mounting plate 12 which has three holes for the lines 9, 10, 11 to pass through is bolted into the connecting piece 2. A screw-in nipple 13 is threaded into each of these holes, in which the lines 9, 10, 11 are carried in an axially moveable fashion.

On the side of the mounting plate 12 facing the robot arm 1, a pleated bellows 14, 15, 16 is pressed onto the screw-in nipple 13. The pleated bellows 14, 15, 16 carry the lines 9, 10, 11 in an axially compliant manner and additionally seal the conduit for the lines, thereby preventing an exchange of fluid between the robot wrist axis 3 and the robot arm 1. This is advantageous because an exchange of fluid between the wrist axis 3 and the robot arm 1 would make cost-intensive cleaning necessary.

The bellows can also be attached with the assistance of a screw-in nipple which is threaded into a hole in the mounting plate and onto which the bellows is pressed. This form of attachment is particularly suitable when each line is routed through a separate bellows.

The axial compliance of the bellows is preferably in the region of 5 mm to 30 mm, where numbers between these limits are possible. However, there is the basic possibility that the bellows possesses greater or lesser compliance.

Materials preferably suitable for the bellows are natural rubber, styrene-butadiene rubber, acrylonitrile-rubber, chlorobutadiene rubber, fluorine rubber or polychlorotetrafluoroethene. These materials have proven to be advantageous regarding durability, compliance and sealing characteristics. However, the invention is not restricted to the previously listed materials for the manufacture of the bellows. Rather, the bellows can consist of other compliant materials, where a plurality of plastic materials can be employed.

Furthermore, the bellows can also be made of metal, where the axial compliance of the bellows is achieved by means of pleats in the bellows, for which reason the bellows is described in this version of the invention as a pleated metal bellows.

As an alternative, it is also possible that several lines are carried jointly through a single bellows. In this instance, the lines are preferably passed through a guide plate which rigidly positions the lines in a predetermined position relative to one another. The guide plate with the individual lines is then located axially as an entity by the bellows. The bellows therefore preferably encompasses the guide plate and is preferably pressed against the peripheral edge of the guide plate by an annular spring.

In order to attach the bellows to the mounting plate, the bellows can have an attaching flange, where the connection between the attaching flange for the bellows and the mounting plate, for example, can be achieved by means of a threaded connection. This type of connection is particularly suitable for passing several lines through one bellows.

Figure 3A:
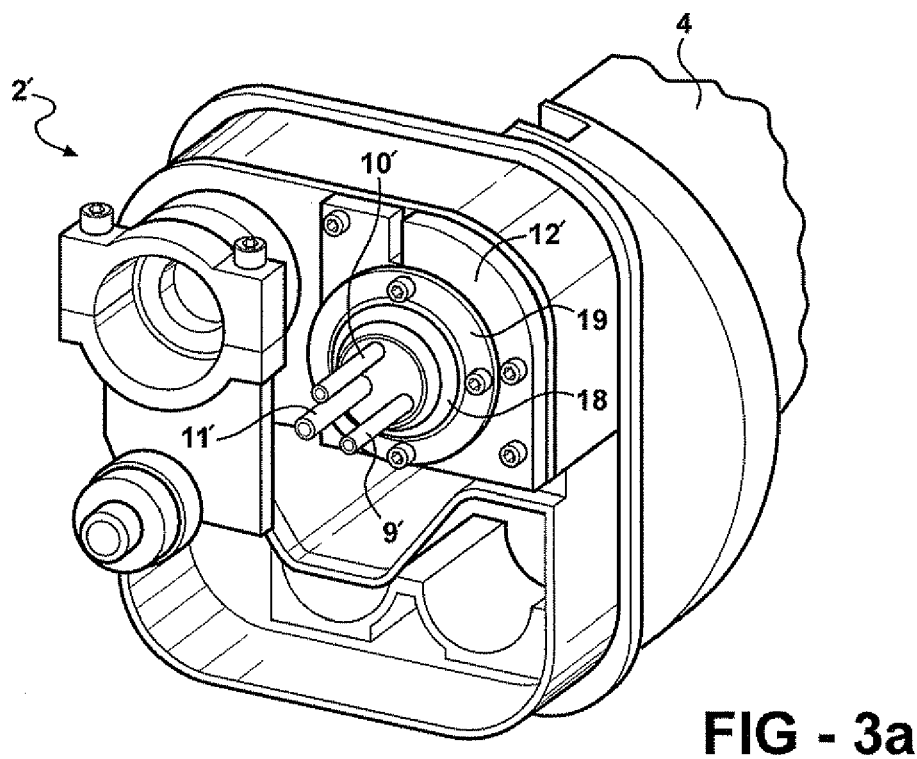
FIG. 3b shows a partially sectioned detail view from FIG. 3a, and FIG. 4 show a partially sectioned view of the wrist axis shown in FIG. 1 with an alternative embodiment of the invention.
Figure 3B:
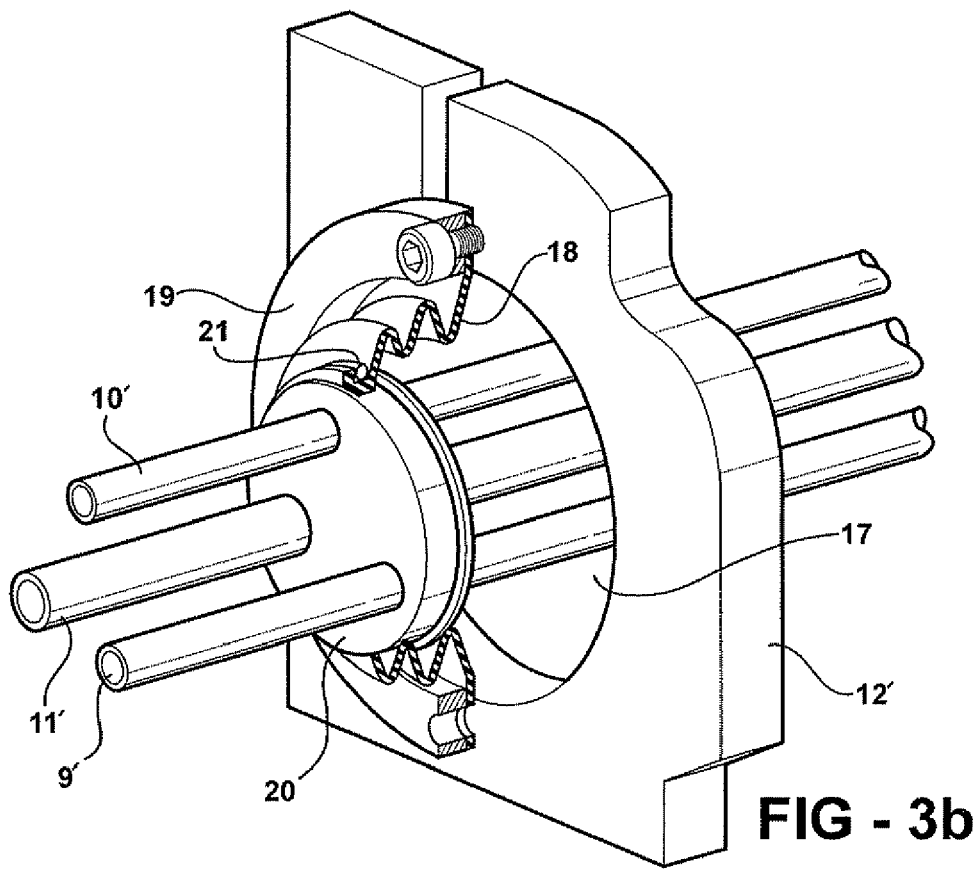

The embodiment shown in FIGS. 3a and 3b is largely identical to the embodiment previously described and shown in FIGS. 2a and 2b, so that the same reference numbers are used for identical components which are identified only by an apostrophe in order to distinguish them. Furthermore, only the special features of this embodiment are described in what follows, while otherwise reference is made to the preceding description for FIGS. 2a and 2b to avoid unnecessary repetition.

One special feature of this embodiment is that the lines 9', 10', 11' are taken jointly through a single hole 17 in the mounting plate 12' and are carried in an axially compliant manner by a single pleated bellows 18. To attach the pleated bellows 18 to the mounting plate 12', the bellows 18 has an annular attaching flange 19 which is bolted to the mounting plate 12'.

The individual lines 9', 10', 11' are passed through holes in a guide plate 20, where the guide plate 20 is disc-shaped and the lines 9', 10', 11' are fixed in a predetermined position relative to one another. The mouth of the pleated bellows 18 encompasses the guide plate 20 at its peripheral edge, where a spring retaining ring 21 presses the pleated bellows onto the peripheral edge of the guide plate 20.

In the case of the version of the invention mentioned initially which carries the line in a spiral in the conduit, the line is preferably wound around a guide element which is preferably located in the center. In the case of this guide element, for example, it may be a line which is axially extensible without difficulty. The conduit then contains a bundle of lines with axially extensible lines in the center around which other lines are wrapped in a spiral.

Figure 4:
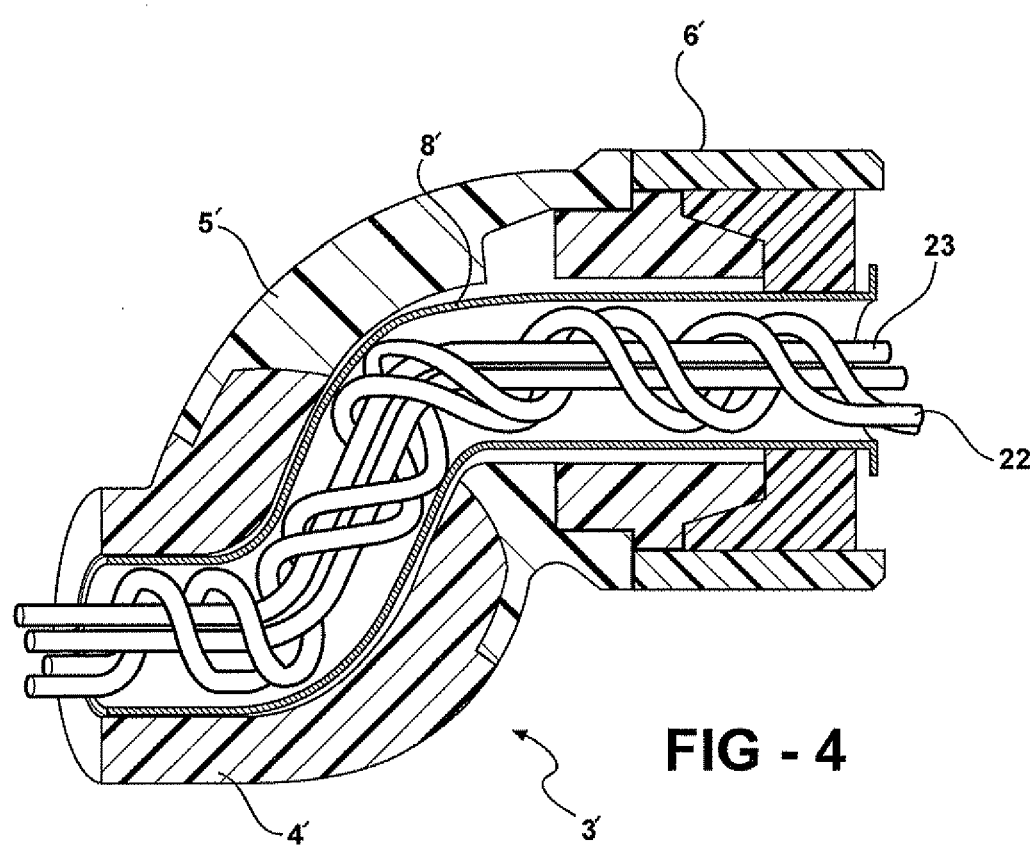

FIG. 4 shows a further embodiment of a robot wrist axis 3' in accordance with the invention with three members 4', 5', 6' which can be rotated relative to each other and a conduit 8' for lines, where numerous lines 22 are carried in a spiral around additional line 23 disposed in the middle. The spiral winding of the lines 22 allows axial compensation in length with the movement of the individual members 4', 5', 6' of the robot wrist axis 3'. The invention is not limited to the previously described embodiments of the invention. Rather, a plurality of variations and derivations is possible, which similarly make use of the inventive idea and therefore fall under its protection.

What is claimed is:

1. An axially flexible robot line routing apparatus for use with a robot arm having an axial path for the line, the routing apparatus comprising:
   a wrist having a first member concentrically attached to the robot arm along the axial path and rotatably moveable with respect to the arm such that the wrist revolves with respect to the arm about the axial path, the axial path extending along a longitudinal axis of the arm;
   at least one robot line positioned along the axial path;
   a bellows positioned along the axial path connected to the line and the robot arm allowing extension or compression of the line along the axial path; and
   a guide plate positioned along the axial path having at least one hole for passage of the line through the guide plate, the guide plate having a peripheral surface engaged by the bellows through a retaining ring positioned around the peripheral surface.

2. The apparatus of claim 1 further comprising a mounting plate positioned between the wrist and the robot arm and attached to the robot arm, the mounting plate having a through hole concentrically positioned along the axial path.

3. The apparatus of claim 2 further comprising an attaching flange for attaching the bellows to the mounting plate.

4. The apparatus of claim 1 wherein the bellows sealingly connects to the robot arm and the line.

5. The apparatus of claim 1 wherein the bellows is made from at least one of natural rubber, styrene butadiene rubber, acrylic nitrile rubber, chlorobutadiene rubber, fluorine rubber or polychlorotetrafluoroethylene.

6. The apparatus of claim 1 wherein the bellows is axially displaceable along the axial path to accommodate movement of the wrist with respect to the robot arm and axial displacement of the line.

7. The apparatus of claim 6 wherein the bellows is displaceable along the axial path in a range of about 5 mm to 3 mm.

8. An axially flexible robot line routing apparatus for use in routing lines along an axial path from a robot arm through a wrist comprising:
- a wrist attached to the arm and rotatable with respect to the arm such that the wrist revolves with respect to the arm about a longitudinal axis of the arm, the longitudinal axis of the arm extending along a portion of the axial path;
- a mounting plate connected to the robot arm positioned between the robot arm and the wrist, the mounting plate having a through hole along the axial path;
- at least one robot line passing from the robot arm through the mounting plate hole and the wrist along the axial path;
- an axially displaceable bellows positioned along the axial path around a portion of the at least one line, the bellows is connected directly to the line and the mounting plate, and
- a flange positioned along the axial path in concentric overlapping relation with a portion of the bellows for sealing connection of the bellows to the mounting plate.

9. The apparatus of claim 8 wherein the bellows sealingly connects to the mounting plate and the line.

10. The apparatus of claim 8 further comprising a guide plate positioned along the axial path having at least one hole for passage of the at least one line and sealing engagement of the guide plate to the at least one line.

11. The apparatus of claim 8, wherein the through hole of the mounting plate allows axial displacement of the line through the mounting plate.

12. An axially flexible robot line routing apparatus for use with a robot arm having an axial path for the line, the routing apparatus comprising:
- a wrist having a first member concentrically attached to the robot arm along the axial path and rotatably moveable with respect to the arm such that the wrist revolves with respect to the arm about the axial path, the axial path extending along a longitudinal axis of the arm;
- at least one robot line positioned along the axial path;
- a bellows positioned along the axial path connected directly to the line and the robot arm allowing extension or compression of the line along the axial path;
- a mounting plate positioned between the wrist and the robot arm and attached to the robot arm, the mounting plate having a through hole concentrically positioned along the axial path; and
- an attaching flange for attaching the bellows to the mounting plate.

13. The apparatus of claim 12 wherein the bellows sealingly connects to the robot arm and the line.

14. The apparatus of claim 12 wherein the bellows is axially displaceable along the axial path to accommodate movement of the wrist with respect to the robot arm and axial displacement of the line.

15. The apparatus of claim 14 wherein the bellows is displaceable along the axial path in a range of about 5 mm to 3 mm.

16. The apparatus of claim 12 wherein the bellows is made from at least one of natural rubber, styrene butadiene rubber, acrylic nitrile rubber, chlorobutadiene rubber, fluorine rubber or polychlorotetrafluoroethylene.

* * * * *